(12) United States Patent
Solichien

(10) Patent No.: US 10,892,814 B2
(45) Date of Patent: Jan. 12, 2021

(54) PERFORMING RECEIVE BEAMFORMING IN A FIFTH GENERATION MILLIMETER WAVE SYSTEM

(71) Applicant: Charter Communications Operating, LLC, St. Louis, MO (US)

(72) Inventor: Yohannes Solichien, Highlands Ranch, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 40 days.

(21) Appl. No.: 16/213,971

(22) Filed: Dec. 7, 2018

(65) Prior Publication Data

US 2020/0186230 A1 Jun. 11, 2020

(51) Int. Cl.
| | |
|---|---|
| *H04B 7/08* | (2006.01) |
| *H04B 7/06* | (2006.01) |
| *H04W 72/04* | (2009.01) |
| *H04B 17/336* | (2015.01) |
| *H04W 72/08* | (2009.01) |
| *H04B 17/327* | (2015.01) |

(52) U.S. Cl.
CPC ........... *H04B 7/086* (2013.01); *H04B 7/0626* (2013.01); *H04B 7/0632* (2013.01); *H04B 17/327* (2015.01); *H04B 17/336* (2015.01); *H04W 72/046* (2013.01); *H04W 72/085* (2013.01)

(58) Field of Classification Search
CPC .... H04B 17/327; H04B 17/336; H04B 7/086; H04B 7/0626; H04B 7/0632; H04W 72/046; H04W 72/085
See application file for complete search history.

(56) References Cited

U.S. PATENT DOCUMENTS

| | | | |
|---|---|---|---|
| 9,191,957 B2 * | 11/2015 | Kim | ............... H04L 5/0051 |
| 9,425,880 B2 * | 8/2016 | Kim | ............... H04L 27/2628 |
| 9,913,277 B2 * | 3/2018 | Liu | ............... H04W 24/10 |
| 10,051,484 B2 * | 8/2018 | Shen | ............... H04W 56/001 |

(Continued)

OTHER PUBLICATIONS

Yuki Inoue et al. (Mar. 2017). Field experimental trials for 5G mobile communication system using 70 GHz-band. In Wireless Communications and Networking Conference Workshops (WCNCW), 2017 IEEE (pp. 1-6). IEEE.

(Continued)

*Primary Examiner* — James M Perez
(74) *Attorney, Agent, or Firm* — Otterstedt, Wallace & Kammer, LLP

(57) ABSTRACT

At an antenna array of a user device, a plurality of transmit beams having first widths are received from an access point. The array, using a receive beam having a second width, wider than the first width, measures a quality metric of each of the plurality of transmit beams, and determines angle of arrival for at least a given one of the plurality of transmit beams having a highest quality metric. The user device advises the access point of results of the quality metric measurement. The antenna array receives, from the access point, a selection, based on the advising, of a best one of the plurality of transmit beams for transmission from the access point to the user device. The antenna array forms a receive beam, having a third width, along the angle of arrival, and the third width is narrower than the second width.

20 Claims, 8 Drawing Sheets

(56) References Cited

U.S. PATENT DOCUMENTS

| | | | | |
|---|---|---|---|---|
| 10,116,370 | B2* | 10/2018 | Obara | H04B 7/10 |
| 10,327,156 | B2* | 6/2019 | Byun | H04B 7/0695 |
| 10,367,565 | B2* | 7/2019 | Jayawardene | H04B 7/0632 |
| 10,425,855 | B2* | 9/2019 | Sun | H04W 28/0236 |
| 10,567,065 | B2* | 2/2020 | Kundargi | H04W 72/085 |
| 10,700,753 | B2* | 6/2020 | Islam | H04B 17/327 |
| 2014/0177607 | A1* | 6/2014 | Li | H04W 52/42 370/336 |
| 2015/0094076 | A1* | 4/2015 | Inoue | H04W 72/046 455/452.1 |
| 2015/0341095 | A1* | 11/2015 | Yu | H04B 7/061 370/252 |
| 2017/0006629 | A1* | 1/2017 | Jung | H04W 72/0446 |
| 2017/0012729 | A1* | 1/2017 | Thomas | H04J 11/0069 |
| 2017/0099673 | A1* | 4/2017 | Byun | H04W 72/10 |
| 2017/0201894 | A1* | 7/2017 | Byun | H04W 16/32 |
| 2017/0238294 | A1* | 8/2017 | Lim | H04L 5/0023 370/277 |
| 2018/0176801 | A1* | 6/2018 | Rune | H04B 7/0617 |
| 2018/0205420 | A1* | 7/2018 | Petersson | H04B 7/0632 |
| 2019/0053162 | A1* | 2/2019 | Islam | H04W 52/0235 |
| 2019/0059129 | A1* | 2/2019 | Luo | H04W 72/042 |
| 2019/0104542 | A1* | 4/2019 | Chendamarai Kannan | H04W 72/046 |
| 2019/0124639 | A1* | 4/2019 | Nilsson | H04W 72/046 |
| 2019/0132858 | A1* | 5/2019 | Petersson | H04W 72/085 |
| 2019/0191411 | A1* | 6/2019 | Petersson | H04L 5/0048 |
| 2019/0207665 | A1* | 7/2019 | Yang | H04B 7/0619 |
| 2019/0215035 | A1* | 7/2019 | Huang | H04B 7/063 |
| 2019/0341984 | A1* | 11/2019 | Zhu | H04B 7/0632 |
| 2019/0373595 | A1* | 12/2019 | Sadiq | H04W 56/001 |
| 2020/0036431 | A1* | 1/2020 | Petersson | H04W 72/042 |
| 2020/0186229 | A1* | 6/2020 | Raghavan | H04B 7/0695 |
| 2020/0186230 | A1* | 6/2020 | Solichien | H04B 7/0626 |
| 2020/0252806 | A1* | 8/2020 | Yerramalli | H04W 74/0808 |

OTHER PUBLICATIONS

Wikipedia, Angle of arrival, Mar. 17, 2018, Retrieved from "https://en.wikipedia.org/w/index.php?title=Angle_of_arrival&oldid=830908205" Sep. 19, 2018 p. 1 of 1.

* cited by examiner

PERFORMING RECEIVE BEAMFORMING IN A FIFTH GENERATION MILLIMETER WAVE SYSTEM

FIELD OF THE INVENTION

The present invention relates generally to the electrical, electronic, and computer arts, and more particularly relates to wireless communications, and the like.

BACKGROUND OF THE INVENTION

Wireless communications, including cellular telephone networks, have become ubiquitous. The fourth generation (4G) of broadband cellular network technology has been widely deployed; potential and current applications include mobile web access, Internet Protocol (IP) telephony, gaming services, high-definition mobile television (TV), video conferencing, and three-dimensional (3D) television.

Recently, the fifth generation (5G) of cellular mobile communications has been proposed, targeting high data rate, reduced latency, energy saving, cost reduction, higher system capacity, and massive device connectivity. The International Telecommunications Union (ITU) IMT-2020 specification calls for speeds up to 20 gigabits per second, achievable with millimeter waves of 15 gigahertz and higher frequency.

Beamforming is used in antenna arrays for directional signal transmission or reception. Elements in an antenna array are combined in such a way that signals at particular angles experience constructive interference while others experience destructive interference. Beamforming can be used at both the transmitting and receiving ends in order to achieve spatial selectivity. The improvement compared with omnidirectional reception/transmission is known as the directivity of the array or beamforming gain. Beamforming techniques used in cellular phone standards have advanced through the generations to make use of more complex systems to achieve higher density cells, with higher throughput. In beamforming, the signal from each element is weighed to "steer" the gain of the antenna array.

SUMMARY OF THE INVENTION

Techniques are provided for performing receive beamforming in a fifth-generation millimeter wave system.

In one aspect, an exemplary method includes receiving, at an antenna array of a user device, from an access point, a plurality of transmit beams having first widths; measuring, with the user device, using a receive beam having a second width, the second width being wider than the first width, a quality metric of each of the plurality of transmit beams; determining, with the user device, angle of arrival for at least a given one of the plurality of transmit beams having a highest quality metric; the user device advising the access point of results of the quality metric measurement; receiving, at the antenna array of the user device, from the access point, a selection, based on the advising, of a best one of the plurality of transmit beams for transmission from the access point to the user device; and forming, at the antenna array of the user device, a receive beam, having a third width, along the angle of arrival for the given one of the plurality of transmit beams having the highest quality metric, the third width being narrower than the second width.

In another aspect, another exemplary method includes transmitting, to an antenna array of a user device, from an access point, a plurality of transmit beams having first widths; receiving, from the user device, at the access point, results of quality metric measurement for each of the plurality of transmit beams; and transmitting, to the antenna array of the user device, from the access point, a selection, based on the results of the quality metric measurement, of a best one of the plurality of transmit beams for transmission from the access point to the user device.

In yet another aspect, an exemplary user device includes an antenna array; and a system-on-chip, coupled to the antenna array, and in turn including: a transmitter/receiver processor; a higher layer processor; an angle-of-arrival measurement unit; and a beamforming weight control unit. The antenna array receives, from an access point, a plurality of transmit beams having first widths; the transmitter/receiver processor measures, with the antenna array of the user device using a receive beam having a second width, the second width being wider than the first width, a quality metric of each of the plurality of transmit beams; the angle-of-arrival measurement unit determines angle of arrival for at least a given one of the plurality of transmit beams having a highest quality metric; the transmitter/receiver processor advises the access point of results of the quality metric measurement; said transmitter/receiver processor receives, from the access point, a selection, based on the advising, of a best one of the plurality of transmit beams for transmission from the access point to the user device and advises the higher layer processor of the selection; and the higher layer processor triggers the beamforming weight control unit to form, at the antenna array, a receive beam, having a third width, along the angle of arrival for the given one of the plurality of transmit beams having the highest quality metric, the third width being narrower than the second width.

In still another aspect, an exemplary access point includes an access point antenna array; a transceiver coupled to the access point antenna array; and a control circuit coupled to the transceiver. the transceiver transmits, via the access point antenna array, to an antenna array of a user device, a plurality of transmit beams having first widths; the transceiver receives, via the access point antenna array, from the user device, results of quality metric measurement for each of the plurality of transmit beams; the control circuit selects a best one of the plurality of transmit beams for transmission from the access point to the user device, based on the results of the quality metric measurement; and the transceiver transmits, via the access point antenna array, to the antenna array of the user device, the selection of the best one of the plurality of transmit beams for transmission from the access point to the user device.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof are preferably implemented in hardware; however, some aspects could be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, while one or more embodiments of the invention or elements thereof are, as noted, preferably implemented in hardware; some aspects could can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s) (e.g., system-on-chip (SoC) and antenna array), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide:
1. Fast receive (RX) beam selection
2. Reduce or eliminate need for separate time for scanning the best RX beams
3. Does not reduce system throughput These and other features and advantages of the present invention will become apparent from the following detailed description of illustrative embodiments thereof, which is to be read in connection with the accompanying drawings.

DETAILED DESCRIPTION OF PREFERRED EMBODIMENTS

In a fifth generation (5G) millimeter wave ("mmWave") system, the wave propagation is quite lossy. For a 5G mmWave system, beamforming is a pertinent technology that is used to close the link budget between the access point (AP) and the user device (UD). So-called "narrow" or "pencil" beams are highly directional, providing improvement as compared with omnidirectional reception/transmission, so that the link budget can be met. However, with such narrow or pencil beams, the access point needs to direct the transmission of the signal towards the UD's location.

Figure 1:
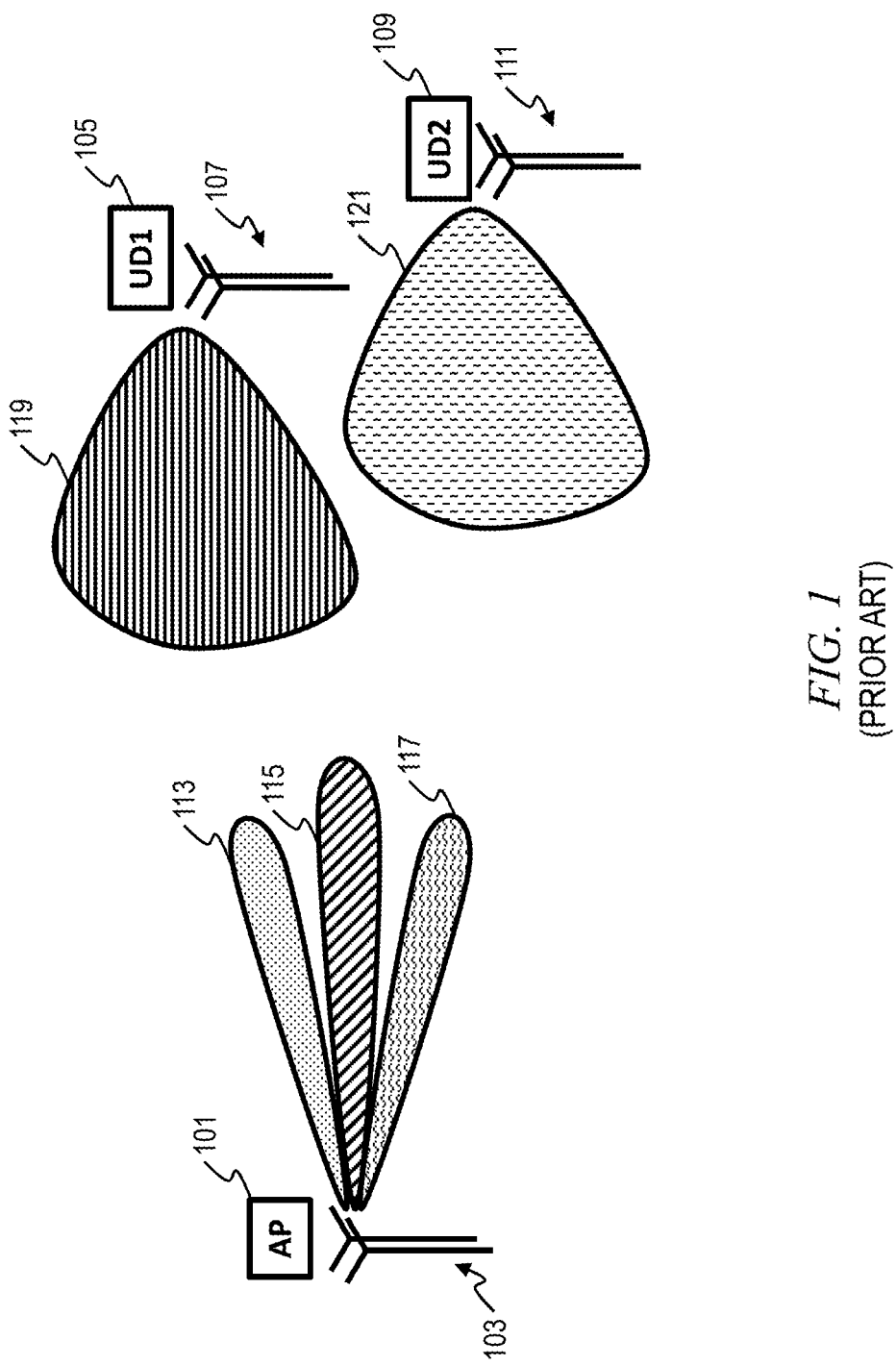
FIG. 1 depicts a technique for selecting the best transmit (TX) beam, according to the prior art.

Refer now to FIG. 1, which depicts a wireless access point (AP) 101 with an antenna array 103; a first user device (UD1) 105 with an antenna array 107; and a second user device (UD2) 109 with an antenna array 111. Note that each antenna array shows only two antennas for purposes of avoiding clutter, but any desired number of antennas (two or more) can be used in each array, and the arrays can have the same or different numbers of antennas. Furthermore, only two user devices are shown to avoid clutter, but additional user devices can be accommodated in one or more embodiments.

The access point 101 knows the direction to transmit the beam to the user device 105, 109 by having one or more time slots in which the access point 101 scans on all the possible beams (e.g., 113, 115, 117; three beams as depicted is a non-limiting example). Each UD 105, 109 creates a wide beam 119, 121 to carry out the measurement of all the beams 113, 115, and 117. During that time slot, the AP 101 sends all the possible beams 113, 115, and 117, the UD 105, 109 measures them, and the UD 105, 109 sends a report back to the AP 101 on the measurement results. Based on the measurement results, the AP 101 knows the best beam selected from 113, 115, and 117, which can be used to transmit data in the direction of the user device 105, 109. The report itself may contain, for example, the received signal strength indicator (RSSI), or the signal-to-noise ratio (SNR). In this manner, the downlink beam is scanned in the direction from the access point 101 to the user device 105, 109.

By way of summary and provision of additional detail, in the approach shown in FIG. 1, with regard to the antennas of the transmit array 103, narrow beams 113, 115, 117 are periodically scanned in time-division duplexing (TDD) fashion. The narrow beams focus the signal energy to a particular direction. The receive antenna arrays 107, 111 produce wide beams 119, 121 during the scanning period. In the transmit beam selection procedure, the UDs 105, 109 perform signal measurements during the scanning period; and the UDs report back to the AP 101 the measurement results for each of the possible candidate beams 113, 115, 117 (RSSI, SNR, etc.) in the uplink. The AP then uses the best beam (based on the report) to each UD.

A problem that arises is that the user device 105, 109 is always receiving and transmitting with a wide beam 119, 121. However, a wide beam limits the distance, the SNR, and the throughput. A difficulty thus arises on the user device side—how to create a narrow beam on the receiver side—how to form narrow beams in the direction of the access point 101? Indeed, a wide RX beam 119, 121 in the UDs produces a lower SNR and thus will reduce the maximum distance and throughput. It is not possible to apply the same technique in reverse (i.e., AP transmit with wide beam, UD receive in narrow beams) since transmitting in wide beam will significantly reduce the possible transmission distance. One or more embodiments are directed to the problem of how the UD can find the best RX beam to maximize SNR, distance, and throughput.

As used herein, an access point generally refers to a cellular telephony base station as opposed to a relatively low-power device as used in a wireless local area network (LAN).

Figure 2:
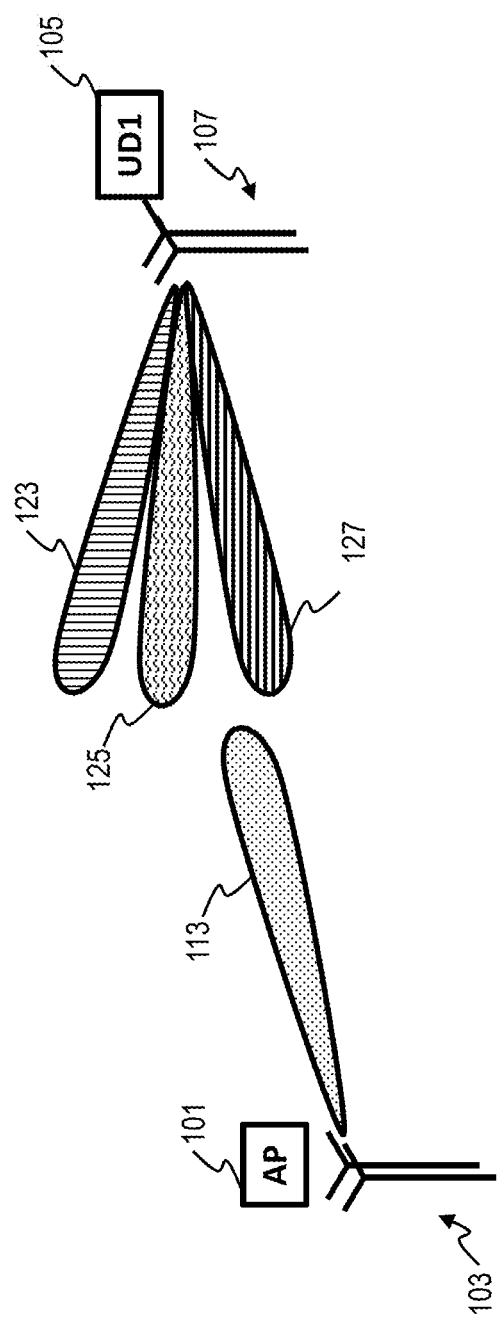
FIG. 2 depicts a "brute force" receive beam selection technique, according to the prior art.

FIG. 2 shows a "brute force" technique to carry out receive beamforming at the user device 105 in the direction of the access point 101. Each UD (e.g., UD 105 in the figure) will request an allocation time (e.g. a timeslot) in which the AP 101 will send the best TX beam 113 in the direction of the user device 105; in that allocation time (which could be one or more time slots), the UD 105 will scan all the possible receive beams 123, 125, and 127 that can be formed by its array 107 (three is a non-limiting exemplary number) and then perform the measurement. Based on that measurement, the UD 105 knows the receive beam direction to be used to obtain the best SNR, and thus the best RX beam to use. A drawback in this "brute force" process is that it is slow. This is because each UD in the system must request an allocation time to perform RX beam scanning. Depending on the number of beams that can be formed on each UD 105, the UD 105 may request one or more time slots for this process, so as to be able to scan all possible beams and then draw a conclusion based on that measurement (i.e. which beam 123, 125, or 127 the UD should form). In addition to being slow, this process also requires requesting one or more dedicated time slot(s), which reduces system throughput since the dedicated measurement time slot(s) cannot be used for data transfer. This is particularly pronounced in the case of moving UDs as each moving UD will need to request allocation.

Figure 3:
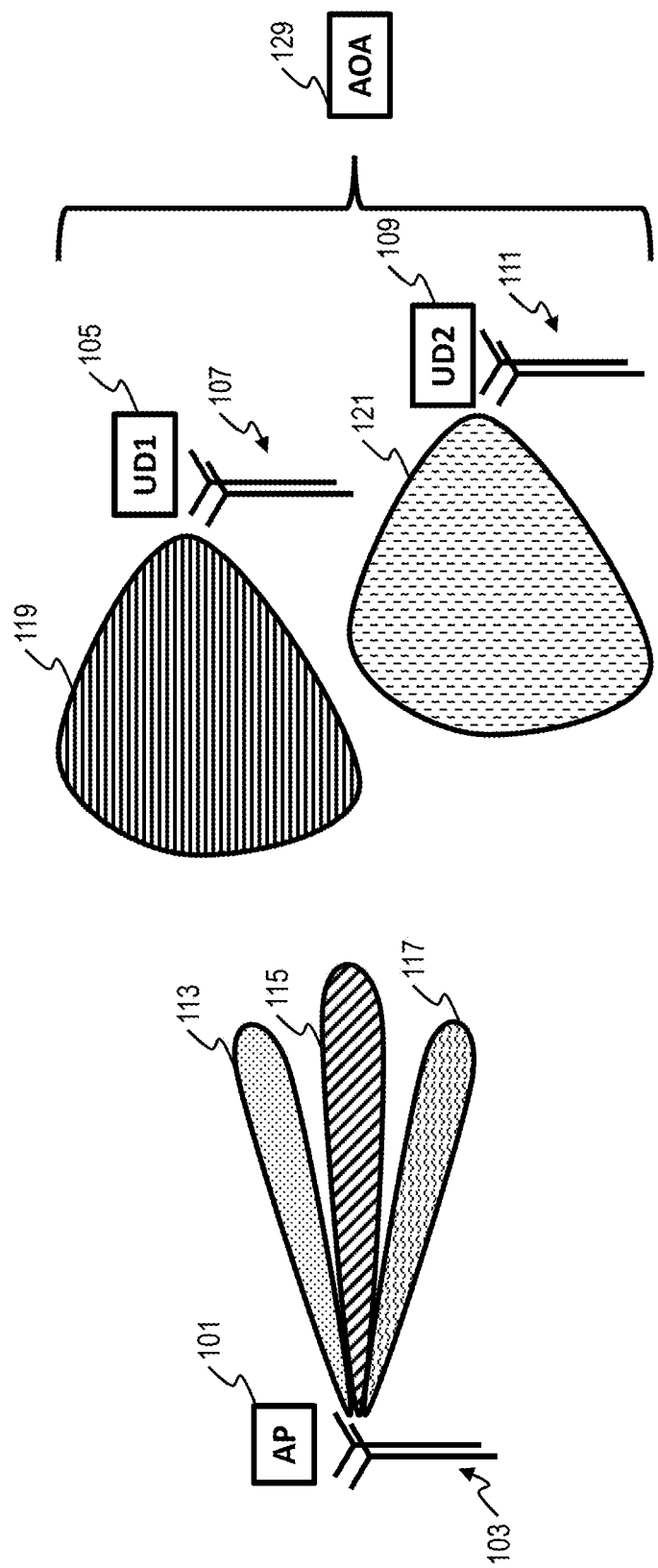
FIG. 3 depicts a receive beam selection technique, using the angle of arrival (AoA) algorithm, according to an aspect of the invention.

FIG. 3 shows an embodiment of the invention, which employs the angle of arrival algorithm 129. Instead of having a dedicated slot for the user device to request to form the receive (RX) beam, as in the "brute force" technique, a simultaneously approach is employed in one or more embodiments. Just as in the technique described with regard to FIG. 1, the downlink measurement is performed first so the AP 101 will scan all the possible beams 113, 115, 117 and the UD 105, 109 will form a wide beam 119, 121 and perform the measurement, then send the report back to the AP 101. From that measurement report, the AP 101 knows the direction of the UD 105, 109, and thus, which is the best beam to use to communicate with the UD. In the embodiment of FIG. 3, however, the technique of FIG. 1 is modified in that the AP 101 informs the UD what beam it is using. For example, the AP 101 is communicating to UD1 105 and in effect advises it "I am going to use the first beam 113 because that is the best beam based on your measurement." From that communication, the UD 105 knows that the AP will use the beam 113 and the UD will compute the angle of arrival of beam 113. Based on that angle of arrival, the UD can form the RX beam towards the direction that the first beam 113 is being transmitted from.

By way of summary and provision of additional detail, in the approach shown in FIG. 3, with regard to the antennas of the transmit array 103, narrow beams 113, 115, 117 are periodically scanned in time-division duplexing (TDD) fashion. The narrow beams focus the signal energy to a particular direction. The receive antenna arrays 107, 111 produce wide beams 119, 121 during the scanning period. In a transmit/receive beam selection procedure, according to an aspect of the invention, the UDs 105, 109 perform signal measurements during the scanning period; and the UDs also perform the AoA algorithm (as discussed elsewhere herein) to estimate the angle of arrival in the UDs. The UDs report back to the AP 101 the measurement results for each of the possible candidate beams 113, 115, 117 (RSSI, SNR, etc.) in the uplink. The AP then uses the best beam (based on the report) to each UD. The AP informs each UD which beam it is using for transmission; the UDs then form the RX beam based on the beam being used by the AP. In general, the AP can use different beam 113, 115, 117 for each UD.

One or more embodiments advantageously provide fast RX beam selections; do not need a separate time for scanning the best RX beams; and/or do not reduce system throughput.

Figure 4:
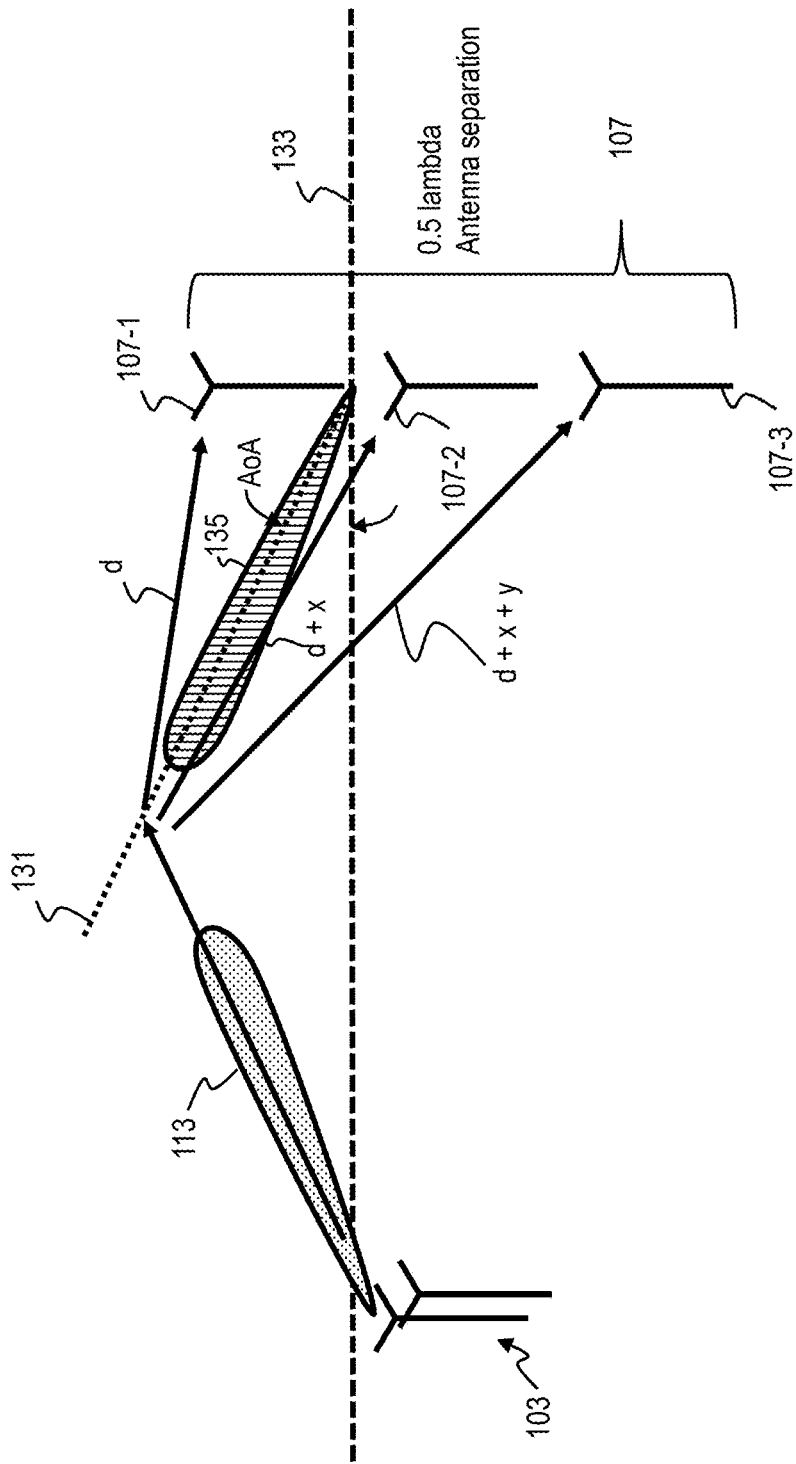
FIG. 4 shows aspects of the angle of arrival (AoA) algorithm, as used in one or more embodiments of the invention.

Refer now to FIG. 4; note that three antennas 107-1, 107-2, and 107-3 are now shown included in array 107 for illustrative purposes. AoA computation is a multi-antenna technique. As depicted, beam 113 does not have a line-of-sight to the user device 105 (not separately depicted) having array 107. Rather, beam 113 reflects off a surface (e.g., a wall)—the reflected beam follows line 131, and is received by multiple antennas (107-1, 107-2, and 107-3) in the UD. The AoA is the angle between the arrival line 131 and the line 133 normal to the receive antenna array, i.e. the angle of incidence of a signal arriving at the receive antenna array elements and its bore sight. The skilled artisan will be familiar with AoA computation per se and will be able to implement one or more embodiments, given the teachings herein. Based on the AoA computed by the UD, the UD can automatically form a beam 135 in the direction of the AoA and the UD does not need a dedicated time slot to scan all the possible RX beams that can be formed. Instead, the UD just relies on the AoA itself. As long as the UD knows which beam 113 is going to be used by the AP, the UD can form the beam 135 automatically based on the computed AoA.

In one or more embodiments, the AP and UD each have arrays of antennas and can form directional beams depending on how each antenna in the array is weighted. The weight (how much of the signal goes to each antenna) is adjusted in order to form the desired beam shape.

In one or more embodiments, control logic including software, firmware, dedicated hardware, and/or some combination thereof is provided on the UD; the logic has the AoA algorithm built in to control how to weight the antennas in the array 107. For example, for a wide beam 119 as in FIG. 3, all the antennas 107-1, 107-2, 107-3 could be equally weighted. The control logic could control the antennas to use the same weight for all antennas; or to form a beam in a certain direction by weighting the antennas in a certain way.

One or more embodiments do not rely solely on the AoA computation, but also make use of the AP advising the UD what beam 113, 115, 117 will be used. This aspect reduces the chance of misalignment between the access point beam and the user device beam. In one or more embodiments, if the UD moves from one place to a different place requiring beam changes, the UD is, in effect, advised by the AP "At slot number X, I will switch the beam to beam number two." The UD then re-adjusts the AoA estimation based on the new beam to be used by the AP. Thus, one or more embodiments do not just use the AoA to form the beam but also the interface notification wherein the AP informs each of the UDs when it is going to switch beams.

In the example of FIG. 4, the antennas 107-1, 107-2, and 107-3 are separated by half a wavelength (i.e., $\lambda/2$ antenna separation). If the UD 105 with three antenna array 107 is moving around, continuous communication with the AP allows picking the best beam and adjusting as the UD moves; switching beams occurs at some point.

The AoA technique measures the phase of the received signal in each of the receive antennas 107-1, 107-2, and 107-3. The difference in phase is due to the progressively longer path traveled to each of the receive antenna (distance d to 107-1; distance d+x to 107-2; and distance d+x+y to 107-3). From the difference in phase, the UD can estimate the AoA. The UD then forms RX beam 135 in the direction 131 of the AoA.

Figure 5:
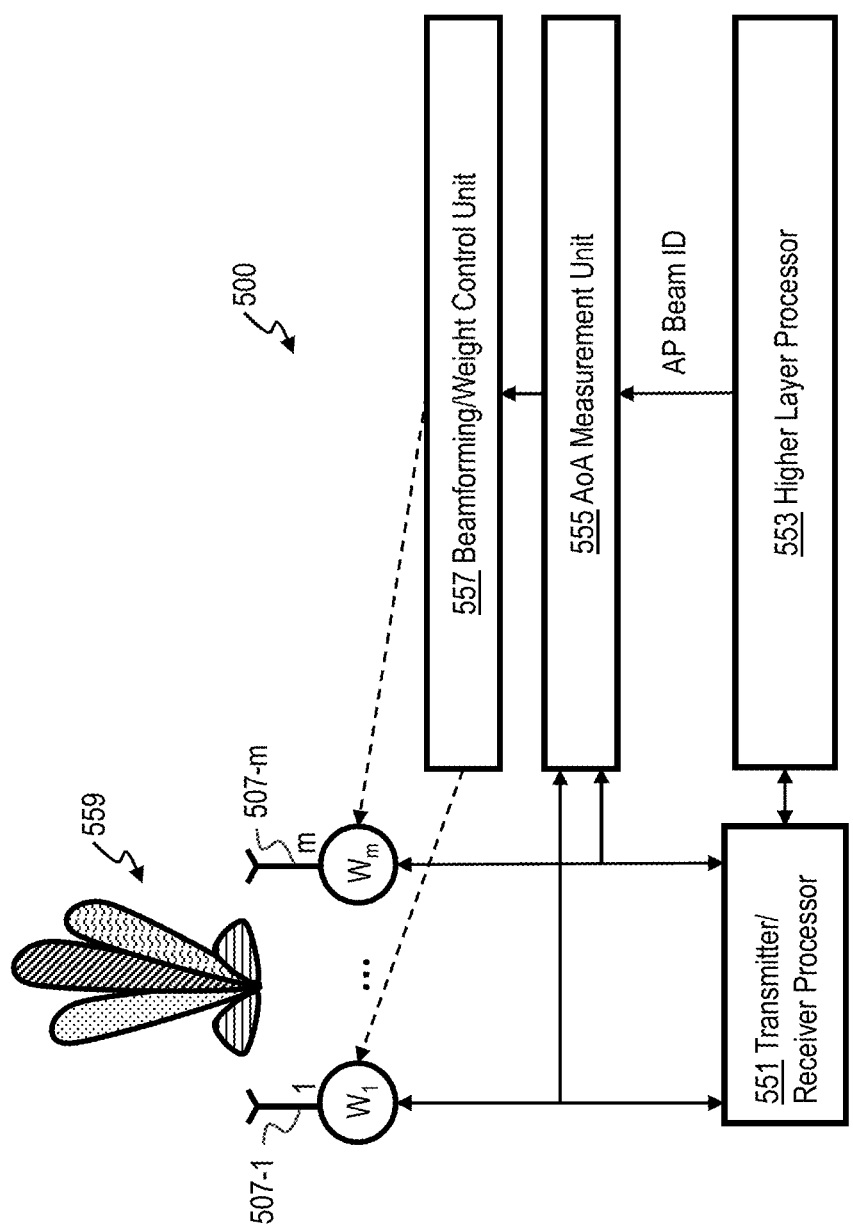
FIG. 5 is a block diagram of a user device (UD) beam control unit, according to an aspect of the invention.

FIG. 5 is a block diagram of an exemplary user device (UD) beam control unit 500. There are m antennas (two or more such that m≥2) in the receive array; the antennas are numbered 1 through m and designated as 507-1 through 507-m. Each antenna has a corresponding weight $W_1$ through $W_m$. The weights $W_1$ through $W_m$ are typically complex weight vectors with different magnitudes and phases. Unit 500 includes a transmitter/receiver processor 551; a higher layer processor 553; an AoA measurement unit 555; and a beamforming/weight control unit 557. Transmitter/receiver processor 551 demodulates signals received via antennas 507-1 through 507-m and modulates uplink signals to be transmitted via antennas 507-1 through 507-m. Higher layer processor 553 extracts the identity of the beam 113 being used to transmit by the AP (AP Beam ID), and supplies same to the AoA measurement unit 555. AoA measurement unit 555 determines the AoA as described with regard to FIG. 4. Beamforming/weight control unit 557 then sets the appropriate weights for each antenna 507-1 through 507-m to provide the desired direction RX beam 135. Beams 559 generally suggest a number of different antenna patterns that can be obtained by suitable weighting.

In some embodiments, the AP Beam ID is explicitly provided to the UD. In other embodiments, the AP implicitly informs the UD that it is going to switch beams at a certain time in the future (say slot x), and expects the UD to compute the AoA at that time.

By way of summary and provision of additional detail, in one or more embodiments, there are m antennas. The data received is processed by Transmitter/Receiver Processor 551. After the wide beam aspect is performed and the narrow beam is being scanned by the access point, the beam strength measurement is performed by the Transmitter/Receiver Processor 551. The information on the measurement is reported back to the access point via the same Transmitter/Receiver Processor 551. There is communication between the AP and the UD. At some point, the AP confirms the beam ID (identity of the beam that will be used by the AP) to the UD. Transmitter/Receiver Processor 551 decodes that information as part of the control channel and reports same to higher-level processor 553.

At some point, the AP uses the Beam ID that has been provided to the UD, triggering the AoA Measurement Unit 555 (which previously measured the AoA for all the beams used during this scanning period and stored same in memory). Based on the beam ID reported by the higher layer processor 553, the Beamforming/Weight Control Unit 557 is triggered to form the beam according to the appropriate AoA along which the narrow beam will arrive, by adjusting the weights $W_1$ through $W_m$. Transmitter/Receiver Processor 551 carries out signal processing including modulation/demodulation and encoding/decoding. Higher layer processor 553 processes information such as control of the timing when the quality metric should be reported back to the AP, as well as control of the timing when a new Beam ID should be used. The processing and control capabilities depicted in the block diagram of FIG. 5 are typically implemented in a single system-on-chip (SoC) in the user device. Given the teachings herein, the skilled artisan can readily implement embodiments of the disclosed invention on an SoC.

Figure 6:
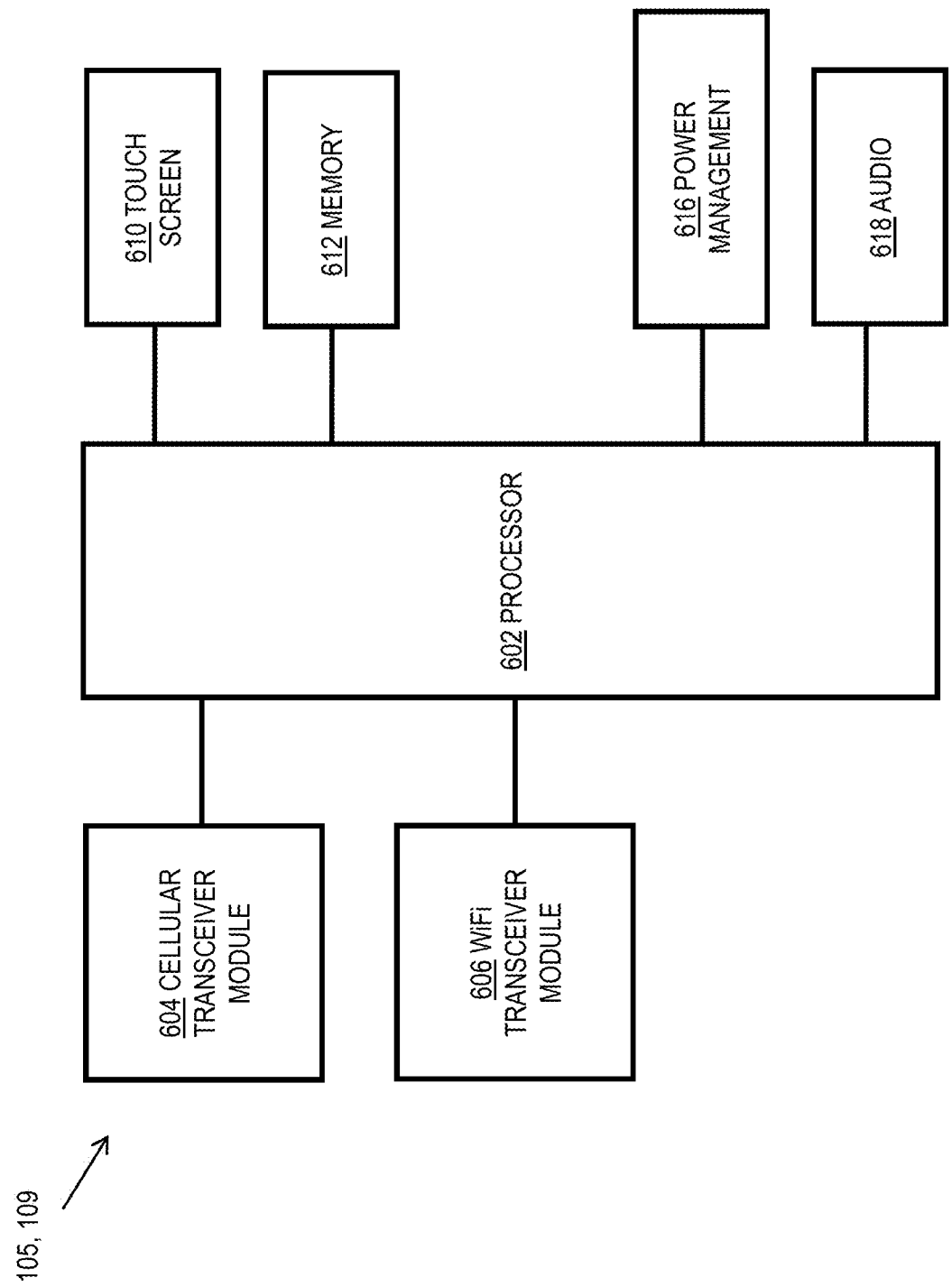
FIG. 6 depicts an exemplary user device, according to an aspect of the invention.

FIG. 6 is a block diagram of an exemplary user device 105, 109, (e.g., a cellular phone or the like). Device 105, 109 includes a suitable processor; e.g., a microprocessor 602. A cellular transceiver module 604 coupled to processor 602 includes an antenna array 107, 111 and appropriate circuitry to send and receive cellular telephone signals (for example, an SoC implementing the elements described with respect to FIG. 5). An optional Wi-Fi transceiver module 606 coupled to processor 602 includes an antenna and appropriate circuitry to allow device 604 to connect to the Internet via a hotspot. The skilled artisan will appreciate that "Wi-Fi" is a trademark of the Wi-Fi Alliance and the brand name for products using the IEEE 802.11 family of standards.

An operating system and one or more applications in memory 612, when loaded into RAM, cause the processor 602 to implement "smart phone" functionality.

Touch screen 610 coupled to processor 602 is also generally indicative of a variety of devices such as a keypad, another type of display, and so on, all of which may or may not be present in one or more embodiments. Audio module 618 coupled to processor 602 includes, for example, an audio coder/decoder (codec), speaker, headphone jack, microphone, and so on. Power management system 616 can include a battery charger, an interface to a battery, and so on. The above-mentioned SoC can include other aspects of the device 105, 109.

Recapitulation

Given the discussion thus far, it will be appreciated that, in general terms, an exemplary method (e.g., from the perspective of a user device 105, 109), according to an aspect of the invention, includes receiving, at an antenna array 107, 111 of a user device 105, 109, from an access point 101, a plurality of transmit beams 113, 115, 117 having first widths. In one or more embodiments, these are the "narrow" beams discussed herein—the narrow beam is a function of the number of array elements. The larger the number of array elements, the narrower the beam that can be generated.

A further step includes measuring, with the user device, using a receive beam 119, 121 having a second width, a quality metric (signal strength is a non-limiting example) of each of the plurality of transmit beams. The second width is wider than the first width. In one or more embodiments, these are the "wide" beams discussed herein—a "wide" beam pattern suggests that the generated beam pattern attempts to cover the largest geographical area in the bore sight direction.

A still further step includes determining, with the user device, angle of arrival (AoA) for at least a given one of the plurality of transmit beams 113 having a highest quality metric. Some embodiments measure the AoA for all the beams, and the AoA for each beam is then stored. Alternatively, the baseband data for all AP beams are stored in the memory, and the AoA is only computed for the beam ID once the beam ID has been informed to the UD by the AP. The disadvantage of storing the baseband data is that it is memory intensive; however, it reduces the computation complexity since it only needs to measure a single AoA.

Furthermore regarding "narrow," the narrow beam is a function of the number of array elements. The larger the number of array elements, the narrower the beam that can be generated. Further, the term 'narrow' beam pattern refers to the smallest beam width (or angle) that can be generated with the available number of antenna elements in a particular direction. In a typical implementation, the narrow beam ranges approximately from 1 to 10 degrees.

Furthermore regarding "wide," as noted, a "wide" beam pattern suggests that the generated beam pattern attempts to cover the largest geographical area in the bore sight direction. Further, as the beam width is a function of the number of antenna array elements, the 'wide' beam pattern can be generated by disabling the number of antenna elements with still enough antenna gain to successfully receive the message sent by the AP. In a typical implementation, the wide beam ranges approximately from 11 to 60 degrees.

An additional step includes the user device 105, 109 advising the access point of results of the quality metric measurement. One or more embodiments provide the results for all beams such that the beam selection is up to the AP to decide. The AP may employ different metrics and techniques (for examples, one may use RSSI as the metric, and the other may elect to use SNR as the metric—they may not come to the same conclusion) to select what it considers the best beam to use. The AP then informs the UD on the selected beam it plans to use, and the UD will then use the appropriate AoA.

Another step includes receiving, at the antenna array of the user device, from the access point, a selection, based on the advising step, of a best one of the plurality of transmit beams for transmission from the access point to the user device. Yet another step includes forming, at the antenna array of the user device, a receive beam 135, having a third width ("narrow") along the angle of arrival (i.e. along line 131) for the given one of the plurality of narrow transmit beams 113 having the highest quality metric. The third width is narrower than the second width.

Typically, a further step will include the user device receiving payload data (as opposed to overhead data) from the access point on the ("narrow") receive beam 135.

In the measuring step, the quality metric can include, for example, signal strength measured as signal-to-noise ratio (SNR) and/or received signal strength indicator (RSSI). Other possible metrics include, for example, Channel State Indication, etc.

As noted, UDs 105, 109 are typically mobile devices which move from time to time. Accordingly, in one or more embodiments, the system repeats the procedure described elsewhere herein to continuously track movement of the UD, i.e. perform measurement on beams 113, 115, 117 by forming a "wide" beam 119, 121; reporting the measurement results to the AP, and the AP informing the UD that it is going to use a different beam at some point in the future. Thus, in some instances, further steps include, responsive to motion of the user device with respect to the access point, receiving, at the antenna array of the user device, from the access point, a new selection of a new best one of the plurality of transmit beams (say, 115 or 117) for transmission from the access point to the user device; determining, with the user device, angle of arrival for the new best one of the plurality of transmit beams for transmission from the access point to the user device; and forming, at the antenna array of the user device, a new receive beam, having a fourth width, along the angle of arrival for the new best one of the plurality of transmit beams for transmission from the access point to the user device. The fourth width is narrower than the second width, and the new receive beam is, in one or more embodiments, a "narrow" beam as described herein.

In one or more embodiments, the receiving steps are carried out at a wavelength of at least one millimeter; the access point is a cell phone tower; and the user device is a cell phone handset. Extremely high frequency (EHF) is the International Telecommunication Union (ITU) designation for the band of radio frequencies in the electromagnetic spectrum from 30 to 300 gigahertz (GHz). It lies between the super high frequency band, and the far infrared band, the lower part of which is also referred to as the terahertz gap. Radio waves in this band have wavelengths from ten to one millimeter, giving it the name millimeter band or millimeter wave, sometimes abbreviated MMW or mmW. In some cases, the receiving steps are carried out at a wavelength of between one millimeter and ten millimeters.

Given the discussion thus far, it will be appreciated that, in general terms, another exemplary method (e.g., from the perspective of an access point 101), according to another aspect of the invention, includes transmitting, to an antenna array 107, 111 of a user device 105, 109, from an access point 101, a plurality of transmit beams 113, 115, 117 having first widths (e.g. "narrow" as described herein); and receiving, from the user device, at the access point, results of quality metric measurement for each of the plurality of transmit beams. A further step includes transmitting, to the antenna array of the user device, from the access point, a selection (explicit or implicit), based on the results of the quality metric measurement, of a best one (e.g. 113) of the plurality of transmit beams for transmission from the access point to the user device. In an "explicit" aspect, the AP sends the user device an explicit beam identification. In an "implicit" aspect, the AP does not explicitly inform the UD it is using this particular beam, but that it is using a beam and will keep using that beam until it informs the UD otherwise.

In one or more embodiments there are multiple user devices; thus, in one or more embodiments, the user device is a first user device and the plurality of transmit beams includes a first plurality of transmit beams, and further steps include transmitting, to an antenna array of a second user device, from the access point, a second plurality of transmit beams having the first widths; receiving, from the second user device, at the access point, results of quality metric measurement for each of the second plurality of transmit beams; transmitting, to the antenna array of the second user device, from the access point, a selection, based on the results of the quality metric measurement of a best one of the second plurality of transmit beams for transmission from the access point to the second user device.

Typically, further steps will include transmitting, to the antenna array of the first user device, from the access point, via the best one of the first plurality of transmit beams, first payload data; and transmitting, to the antenna array of the second user device, from the access point, via the best one of the second plurality of transmit beams, second payload data ("first" and "second" in this context are used arbitrarily to distinguish one user device/plurality of transmit beams/payload data from another; no particular spatial arrangement of the user device/plurality of transmit beams/payload data is intended to be implied). Payload data includes voice or actual data using the selected beams, as opposed to overhead. Once the beam ID is informed to the UD (i.e. at slot number x, I am going to use beam 113), the control/payload/voice transmission will use that particular beam ID. Any subsequent beam ID changes due to UD mobility, or other factors, will be informed to the UD via the control channel.

In the receiving step, the quality metric can include, for example, signal strength measured as signal-to-noise ratio (SNR) and/or received signal strength indicator (RSSI), or other metrics.

As noted, UDs 105, 109 are typically mobile devices which move from time to time. Thus, in some instances, further steps include, responsive to motion of the user device with respect to the access point, transmitting, to the antenna array of the user device, from the access point, a new selection of a new best one of the plurality of transmit beams for transmission from the access point to the user device; and transmitting, to the antenna array of the first user device, from the access point, via the new best one of the first plurality of transmit beams, payload data. Refer to the above discussion of repeated steps to continuously track movement of the UD(s).

In one or more embodiments, the transmitting and receiving steps are carried out at a wavelength of at least one millimeter; the access point is a cell phone tower; and the user device(s) is/are cell phone handset(s). See above discussion of extremely high frequency (EHF). In some cases, the transmitting and receiving steps are carried out at a wavelength of between one millimeter and ten millimeters.

In another aspect, a user device 105, 109 includes an antenna array 107, 111 and a system-on-chip, coupled to the antenna array; the SoC in turn includes a transmitter/receiver processor 551; a higher layer processor 553; an angle-of-arrival measurement unit 55; and a beamforming weight control unit 557. The antenna array 107, 111 receives, from an access point 101, a plurality of transmit beams 113, 115, 117 having first widths. The transmitter/receiver processor 551 measures, with the antenna array 107, 111 of the user device using a receive beam 119, 121 having a second width, a quality metric of each of the plurality of transmit beams. The second width is wider than the first width. The angle-of-arrival measurement unit 555 determines angle of arrival for at least a given one of the plurality of transmit beams having a highest quality metric. The transmitter/receiver processor 551 advises the access point of results of the quality metric measurement. The transmitter/receiver processor 551 receives, from the access point, a selection, based on the advising, of a best one of the plurality of transmit beams for transmission from the access point to the user device and advises the higher layer processor of the selection. The higher layer processor 553 triggers the beamforming weight control unit 557 to form, at the antenna array, a receive beam, having a third width, along the angle of arrival for the given one of the plurality of transmit beams having the highest quality metric. The third width is narrower than the second width.

In one or more embodiments, the user device receives payload data from the access point on the receive beam having the third width.

As discussed elsewhere herein, in one or more embodiments, responsive to motion of the user device with respect to the access point, the transmitter/receiver processor receives, from the access point, a new selection of a new best one of the plurality of transmit beams for transmission from the access point to the user device and advises the higher layer processor of the new selection; the angle-of-arrival measurement unit determines angle of arrival for the new best one of the plurality of transmit beams for transmission from the access point to the user device; and the higher layer processor triggers the beamforming weight control unit to form, at the antenna array, a new receive beam, having a fourth width, along the angle of arrival for the new best one of the plurality of transmit beams. The fourth width is narrower than the second width.

Figure 7:
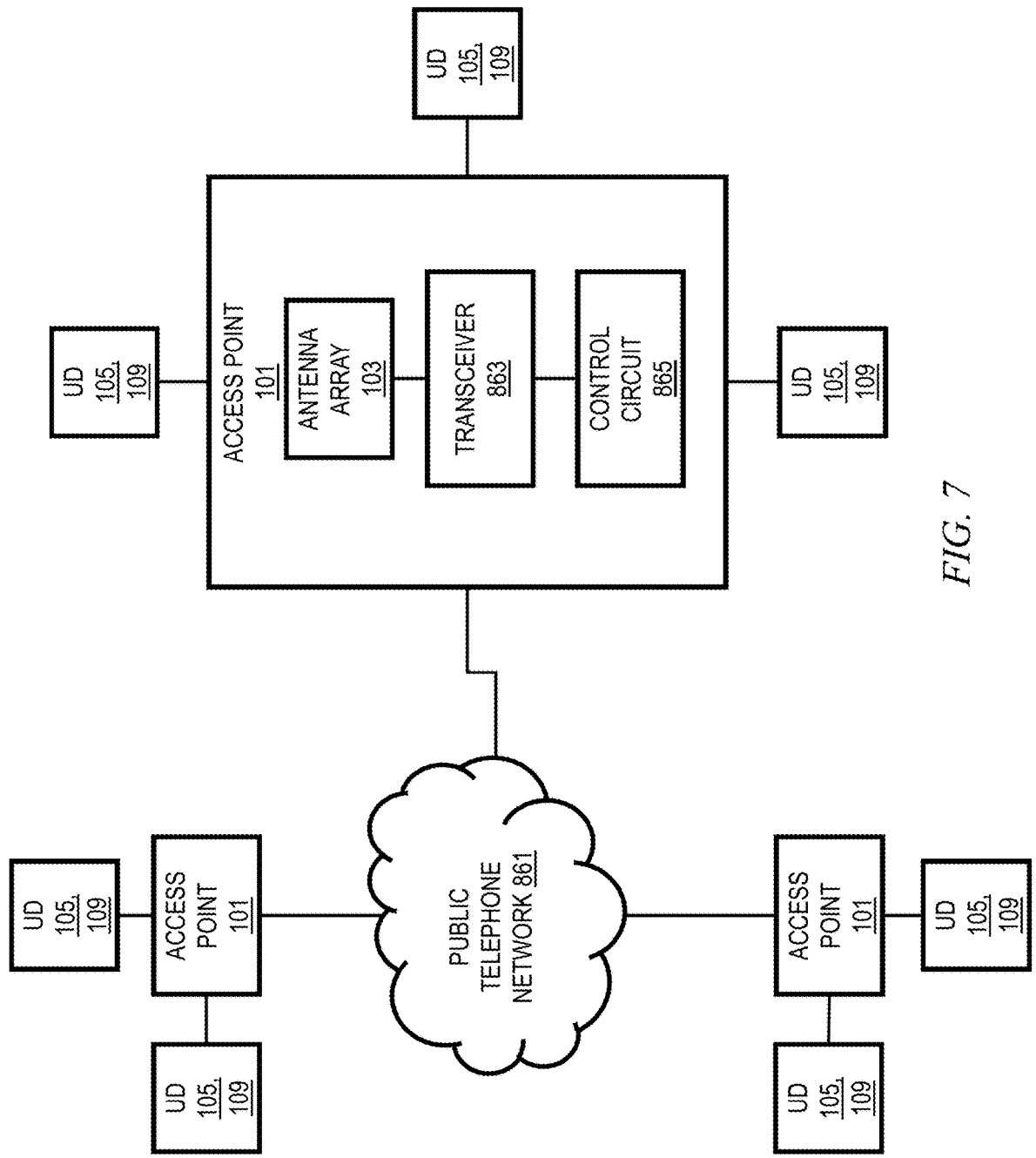
FIG. 7 depicts an exemplary access point in an exemplary cellular network, according to an aspect of the invention.

In still another aspect, referring to FIG. 7, an access point 101 includes an access point antenna array 103; a transceiver 863 coupled to the access point antenna array; and a control circuit 865 coupled to the transceiver. Typically, a plurality of access points 101 correspond to "cell towers" each in wireless communication with a plurality of user devices 105, 109 and coupled to the public telephone network 861 in a manner well-known in the field of cellular telephony. the transceiver 863 transmits, via the access point antenna array 103, to an antenna array 107, 111 of a user device, a plurality of transmit beams having first widths. The transceiver receives, via the access point antenna array, from the user device, results of quality metric measurement for each of the plurality of transmit beams. The control circuit selects a best one of the plurality of transmit beams for transmission from the access point to the user device, based on the results of the quality metric measurement. The transceiver transmits, via the access point antenna array, to the antenna array of the user device, the selection of the best one of the plurality of transmit beams for transmission from the access point to the user device.

Typically, as noted, there are multiple user devices in communication with an access point, such that the user device includes a first user device; the plurality of transmit beams include a first plurality of transmit beams; the transceiver transmits, via the access point antenna array, to an antenna array of a second user device, a second plurality of transmit beams having the first widths; the transceiver receives, via the access point antenna array, from the second user device, results of quality metric measurement for each of the second plurality of transmit beams; the control circuit selects a best one of the second plurality of transmit beams for transmission from the access point to the second user device, based on the results of the quality metric measurement for each of the second plurality of transmit beams; and the transceiver transmits, via the access point antenna array, to the antenna array of the second user device, the selection of the best one of the second plurality of transmit beams.

System and Article of Manufacture Details

As noted above, one or more embodiments of the invention or elements thereof are preferably implemented in hardware; however, some embodiments can employ, for example, a combination of hardware and software aspects. For example, portions of some control functionality could be implemented at least partially in software or firmware. Software includes but is not limited to firmware, resident software, microcode, etc. One or more embodiments of the invention or elements thereof can, in some embodiments, be implemented in part in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented, in part, in the form of an apparatus including a memory and at least one processor that is coupled to the memory and operative to perform, or facilitate performance of, exemplary method steps.

Figure 8:
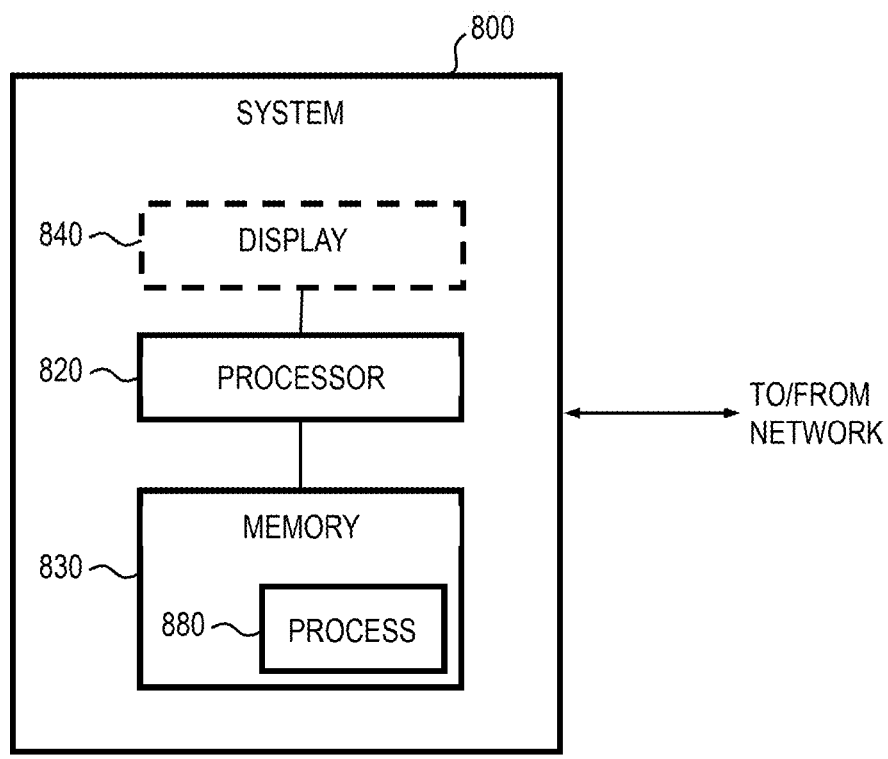
FIG. 8 is a block diagram of a computer system useful in connection with one or more aspects of the invention.

FIG. 8 is a block diagram of a system 800 that can implement at least some aspects of the invention in some cases. As shown in FIG. 8, memory 830 configures the processor 820 to implement one or more methods, steps, and functions (collectively, shown as process 880 in FIG. 8). The memory 830 could be distributed or local and the processor 820 could be distributed or singular. Different steps could be carried out by different processors.

The memory 830 could be implemented as an electrical, magnetic or optical memory, or any combination of these or other types of storage devices. It should be noted that if distributed processors are employed, each distributed processor that makes up processor 820 generally contains its own addressable memory space. It should also be noted that some or all of computer system 800 can be incorporated into an application-specific or general-use integrated circuit. For example, one or more method steps could be implemented in hardware in an ASIC or via a field-programmable gate array (FPGA) rather than using firmware. Display 840 is representative of a variety of possible input/output devices (e.g., keyboards, mice, and the like). Every processor may not have a display, keyboard, mouse or the like associated with it.

As is known in the art, in some cases, part of one or more aspects of the methods and apparatus discussed herein may be distributed as an article of manufacture that itself includes a tangible computer readable recordable storage medium having computer readable code means embodied thereon. The computer readable program code means is operable, in some instances, in conjunction with a computer system (including, for example, system 800 or the like), to carry out some of the steps to perform the methods discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will, in some cases, configure associated processors to implement some of the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can, in some cases, include a computer program product comprising computer program code means adapted to perform some of the steps of any methods or claims set forth herein when such program is run, for example, on a processor of a device, access point, or the like, and that such program may be embodied on a tangible computer readable recordable storage medium. As used herein, including the claims, unless it is unambiguously apparent from the context that only server software is being referred to, a "server" includes a physical data processing system (for example, system 800 as shown in FIG. 8) running one or more server programs. It will be understood that such a physical server may or may not include a display, keyboard, or other input/output components.

Furthermore, it should be noted that if portions of methods described herein are implemented partially in software or firmware, they can include an additional step of providing a system comprising distinct software modules embodied on one or more tangible computer readable storage media. All the modules (or any subset thereof) can be on the same medium, or each can be on a different medium, for example. Some method steps can then be carried out using the distinct software modules of the system, executing on one or more hardware processors (e.g., one or more hardware processors of a device, access point, or the like. Further, a computer program product can include a tangible computer-readable recordable storage medium with code adapted to be executed to carry out some method steps described herein, including the provision of the system with the distinct software modules.

Accordingly, it will be appreciated that portions of some embodiments of the invention can include a computer program including computer program code means adapted to perform some steps of any methods or claims set forth herein when such program is implemented on a processor, and that such program may be embodied on a tangible computer readable recordable storage medium. Further, one or more embodiments of the present invention can include a processor including code adapted to cause the processor to carry out some steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
    receiving, at an antenna array of a user device, from an access point, a plurality of transmit beams having first widths;
    measuring, with said user device, using a receive beam having a second width, said second width being wider than said first width, a quality metric of each of said plurality of transmit beams;
    determining, with said user device, angle of arrival for at least a given one of said plurality of transmit beams having a highest quality metric;
    said user device advising said access point of results of said quality metric measurement;
    receiving, at said antenna array of said user device, from said access point, a selection, based on said advising, of a best one of said plurality of transmit beams for transmission from said access point to said user device; and
    forming, at said antenna array of said user device, a receive beam, having a third width, along said angle of arrival for said given one of said plurality of transmit beams having said highest quality metric, said third width being narrower than said second width.

2. The method of claim 1, further comprising said user device receiving payload data from said access point on said receive beam having said third width.

3. The method of claim 1, wherein, in said measuring step, said quality metric comprises signal strength measured as signal-to-noise ratio (SNR).

4. The method of claim 1, wherein, in said measuring step, said quality metric comprises signal strength measured as received signal strength indicator (RSSI).

5. The method of claim 1, further comprising:
    responsive to motion of said user device with respect to said access point, receiving, at said antenna array of said user device, from said access point, a new selection of a new best one of said plurality of transmit beams for transmission from said access point to said user device;
determining, with said user device, angle of arrival for said new best one of said plurality of transmit beams for transmission from said access point to said user device; and
forming, at said antenna array of said user device, a new receive beam, having a fourth width, along said angle of arrival for said new best one of said plurality of transmit beams for transmission from said access point to said user device, said fourth width being narrower than said second width.

6. The method of claim 1, wherein said receiving steps are carried out at wavelengths of at least one millimeter.

7. The method of claim 6, wherein said access point comprises a cell phone tower and said user device comprises a cell phone handset.

8. A method comprising the steps of:
transmitting, to an antenna array of a user device, from an access point, a plurality of transmit beams having first widths;
receiving, from said user device, at said access point, results of quality metric measurement for each of said plurality of transmit beams; and
transmitting, to said antenna array of said user device, from said access point, an identification of a selection, based on said results of said quality metric measurement, of a best one of said plurality of transmit beams for transmission from said access point to said user device that said access point will switch to for transmission beginning at a specified transmission slot.

9. The method of claim 8, wherein said user device comprises a first user device and said plurality of transmit beams comprises a first plurality of transmit beams, further comprising:
transmitting, to an antenna array of a second user device, from said access point, a second plurality of transmit beams having said first widths;
receiving, from said second user device, at said access point, results of quality metric measurement for each of said second plurality of transmit beams; and
transmitting, to said antenna array of said second user device, from said access point, a selection, based on said results of said quality metric measurement, of a best one of said second plurality of transmit beams for transmission from said access point to said second user device.

10. The method of claim 9, further comprising:
transmitting, to said antenna array of said first user device, from said access point, via said best one of said first plurality of transmit beams, first payload data; and
transmitting, to said antenna array of said second user device, from said access point, via said best one of said second plurality of transmit beams, second payload data.

11. The method of claim 8, wherein, in said receiving step, said quality metric comprises signal strength measured as signal-to-noise ratio (SNR).

12. The method of claim 8, wherein, in said receiving step, said quality metric comprises signal strength measured as received signal strength indicator (RSSI).

13. The method of claim 8, further comprising:
responsive to motion of said user device with respect to said access point, transmitting, to said antenna array of said user device, from said access point, a new selection of a new best one of said plurality of transmit beams for transmission from said access point to said user device; and
transmitting, to said antenna array of said first user device, from said access point, via said new best one of said first plurality of transmit beams, payload data.

14. The method of claim 8, wherein said transmitting and receiving steps are carried out at wavelengths of at least one millimeter.

15. The method of claim 14, wherein said access point comprises a cell phone tower and said user devices comprise cell phone handsets.

16. A user device comprising:
an antenna array; and
a system-on-chip, coupled to said antenna array, and in turn including:
a transmitter/receiver processor;
a higher layer processor;
an angle-of-arrival measurement unit; and
a beamforming weight control unit;
wherein:
said antenna array receives, from an access point, a plurality of transmit beams having first widths;
said transmitter/receiver processor measures, with said antenna array of said user device using a receive beam having a second width, said second width being wider than said first width, a quality metric of each of said plurality of transmit beams;
determining, with said angle-of-arrival measurement unit, angle of arrival for at least a given one of said plurality of transmit beams having a highest quality metric;
said transmitter/receiver processor advises said access point of results of said quality metric measurement;
said transmitter/receiver processor receives, from said access point, a selection, based on said advising, of a best one of said plurality of transmit beams for transmission from said access point to said user device and advises said higher layer processor of said selection; and
said higher layer processor triggers said beamforming weight control unit to form, at said antenna array, a receive beam, having a third width, along said angle of arrival for said given one of said plurality of transmit beams having said highest quality metric, said third width being narrower than said second width.

17. The user device of claim 16, wherein said user device receives payload data from said access point on said receive beam having said third width.

18. The user device of claim 16, wherein:
responsive to motion of said user device with respect to said access point, said transmitter/receiver processor receives, from said access point, a new selection of a new best one of said plurality of transmit beams for transmission from said access point to said user device and advises said higher layer processor of said new selection;
said angle-of-arrival measurement unit determines angle of arrival for said new best one of said plurality of transmit beams for transmission from said access point to said user device; and
said higher layer processor triggers said beamforming weight control unit to form, at said antenna array, a new receive beam, having a fourth width, along said angle of arrival for said new best one of said plurality of transmit beams, said fourth width being narrower than said second width.

19. An access point comprising:
an access point antenna array;
a transceiver coupled to said access point antenna array; and
a control circuit coupled to said transceiver;
wherein:
said transceiver transmits, via said access point antenna array, to an antenna array of a user device, a plurality of transmit beams having first widths;
said transceiver receives, via said access point antenna array, from said user device, results of quality metric measurement for each of said plurality of transmit beams;
said control circuit selects a best one of said plurality of transmit beams for transmission from said access point to said user device, based on said results of said quality metric measurement; and
said transceiver transmits, via said access point antenna array, to said antenna array of said user device, an identification of said selection of said best one of said plurality of transmit beams for transmission from said access point to said user device that said access point will switch to for transmission beginning at a specified transmission slot.

20. The access point of claim 19, wherein:
said user device comprises a first user device;
said plurality of transmit beams comprise a first plurality of transmit beams;
said transceiver transmits, via said access point antenna array, to an antenna array of a second user device, a second plurality of transmit beams having said first widths;
said transceiver receives, via said access point antenna array, from said second user device, results of quality metric measurement for each of said second plurality of transmit beams;
said control circuit selects a best one of said second plurality of transmit beams for transmission from said access point to said second user device, based on said results of said quality metric measurement for each of said second plurality of transmit beams; and
said transceiver transmits, via said access point antenna array, to said antenna array of said second user device, an identification of said selection of said best one of said second plurality of transmit beams.

* * * * *